Jan. 18, 1949.                    F. D. FRISBY                    2,459,157
                               PISTON PACKING RING
Filed June 22, 1946                                          2 Sheets-Sheet 1
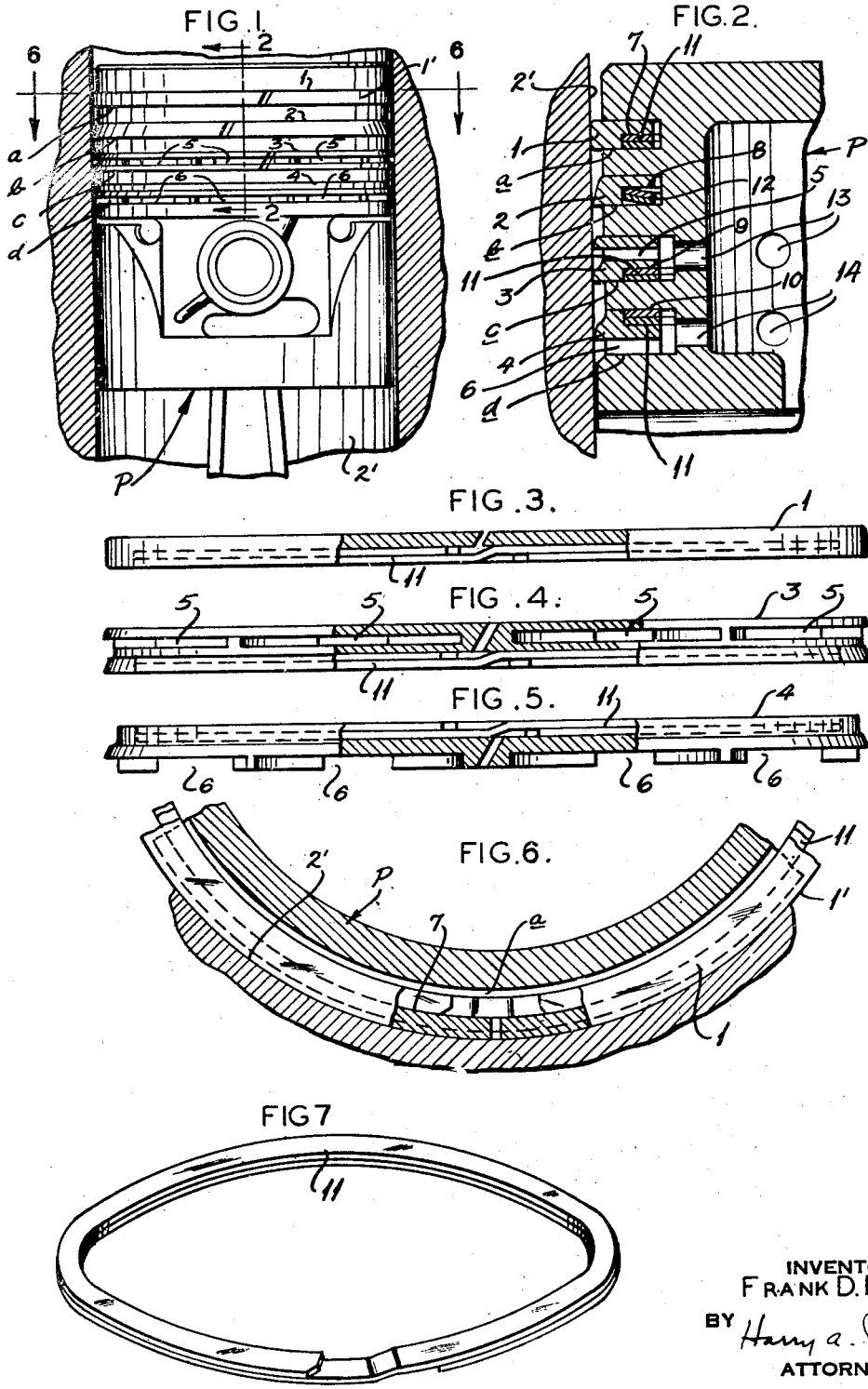
INVENTOR
FRANK D. FRISBY
BY Harry A. Benner
ATTORNEY

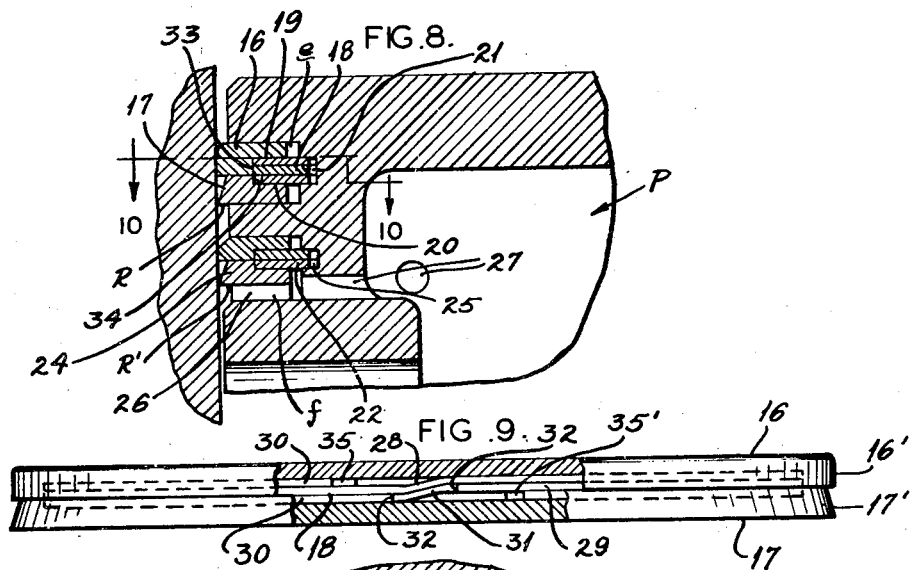
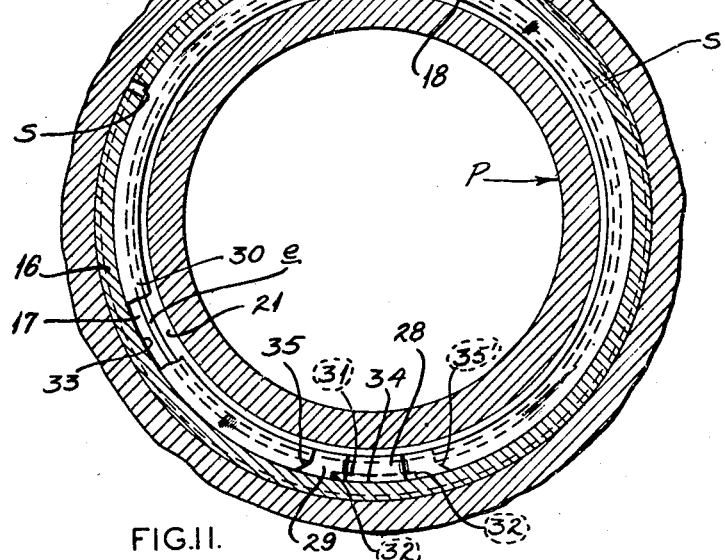
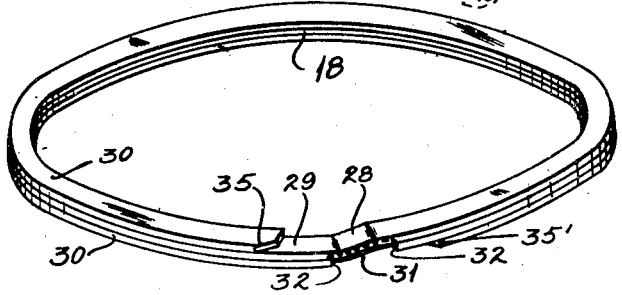
INVENTOR
FRANK D. FRISBY
BY Harry A. Benner
ATTORNEY Patented Jan. 18, 1949

2,459,157

UNITED STATES PATENT OFFICE 2,459,157

PISTON PACKING RING

Frank D. Frisby, St. Louis, Mo., assignor to Frisby Corporation, St. Louis, Mo., a corporation of Missouri Application June 22, 1946, Serial No. 678,534

4 Claims. (Cl. 309—44)

My invention has relation to improvements in piston packing rings and consists in the novel features of construction more fully set forth in the specification and pointed out in the claims.

The invention is primarily directed to a composite piston ring embodying a packing element and a tensioning element in cooperative relation therewith.

The packing element may be of any well-known type, either for the purposes of insuring compression or controlling oil; while the tensioning element is essentially for exerting tension on the packing element, either circumferentially in order to maintain the element in intimate contact with the cylinder wall, or axially whereby the packing element is stabilized in the piston ring groove. Obviously, both of these properties may be combined in one ring, as will be hereinafter more apparent.

The principal object of the present invention is to provide a packing ring having improved properties with respect to sealing compression and controlling oil. And at the same time to insure maximum flexibility of ring action, whereby the ring will follow the contour of the cylinder wall and adapt itself to inequalities therein due to wear. Other advantages will be apparent from the following detailed description of the invention in which—

Figure 1 is a side elevation of a piston equipped with my improved rings; Fig. 2 is an enlarged longitudinal section of the piston head taken on the line 2—2 of Fig. 1; Fig. 3 is an enlarged side elevation of the ring shown in the top groove in Fig. 1; Fig. 4 is an enlarged side elevation of the ring shown in the third groove; Fig. 5 is an enlarged side elevation of the ring shown in the bottom groove; Fig. 6 is an enlarged cross-sectional view taken on the line 6—6 of Fig. 1; Fig. 7 is a perspective view of the expander spring; Fig. 8 is a sectional view similar to Fig. 2 showing a modified form of the invention embodied in two slightly different rings; Fig. 9 is a side elevation of the upper ring shown in Fig. 8 with parts broken away; Fig. 10 is a cross-sectional view taken on a plane indicated by the line 10—10 in Fig. 8; and Fig. 11 is a perspective view of the expander spring shown in the upper ring of Fig. 8.

Referring to the drawings (for the present Figs. 1 to 7 inclusive), P represents a piston of conventional form, having four grooves $a$, $b$, $c$, and $d$, in which are shown four variations of my improved ring. The ring 1 in the upper groove is a compression ring having a straight outer-cylinder contacting face 1', the ring 2 in the second groove having a tapered cylinder contacting face 2', while the rings 3 and 4 in grooves $c$ and $d$ are oil rings, the former having two cylinder contacting edges 3' and 3'', while the latter has but a single cylinder contacting edge 4'. The ring 3 is provided with a plurality of circumferentially arranged oil drainage ports 5, disposed between the cylinder contacting surfaces 3' and 3'', while the ring 4 has a plurality of circumferentially disposed oil drainage passageways 6 formed on the lower surface of the ring.

Each of the rings 1, 2, 3, and 4 is fitted into its respective groove with the usual clearance; and is provided with a recess for the reception of a helical spring segment. In the case of rings 1, 2, and 3, the recesses 7, 8, and 9 are in the lower surface of the rings, while in the case of ring 4, the recess 10 is in the upper surface as clearly shown in the drawings. It will be observed that rings 1, 3, and 4 have similar helical spring elements 11 lodged within their respective recesses 7, 9, and 10, while the ring 2 has a helical spring element 12 of a truncated formation. In other words, the spring element 12 is warped in the recess 8 so as to exert axial pressure on the ring 2 as well as radial pressure thereon, whereby the ring 2 is stabilized in the groove B.

It also will be observed that while the rings 1, 2, 3, and 4 are not identical they all have in common the helical spring element which exerts radial pressure on the ring with which it is associated so as to maintain the ring in contact with the cylinder wall under substantial pressure. The helical spring elements in each instance tend to wind and unwind in action, and at the same time maintain their circularity so that their pressure is communicated to the piston ring proper uniformly throughout the 360° of its contacting surface with the cylinder wall. The expander springs 7, 8, 9, and 10 are floating in their respective grooves and do not depend on contact with the groove bottoms for their spring action. This insures uniform spring pressure on the rings and freedom of action under all conditions.

In addition to the features hereinabove pointed out, the cylinder contacting surfaces of the respective rings may be coated or plated with a suitable metal to assist in the breaking-in action of the ring. As this is an expedient in more or less common use, no specific claims are made to this feature.

In the operation of my improved piston rings with the particular arrangement of rings as shown in the drawings, the upper ring will serve effectively as a compression ring, while the second ring will serve as a compression and an oil ring. Because of the axial pressure exerted against the ring, oil pumping action due to the rapid movement of the ring back and forth in the groove will be effectively eliminated, and the tapered cylinder contacting face 2' will operate effectively to remove excess accumulations of oil from the cylinder wall. The rings 3 and 4 are primarily oil rings in that they are designed to remove excess oil from the cylinder wall and at the same time vent such oil accumulations through the port 5 and passageway 6 of the rings 3 and 4 respectively. Obviously, the grooves c and d are provided with oil ports 13 and 14, through which excess oil is drained and ultimately finds its way back to the cylinder case, as is well-known in the art.

One of the advantages of the helical spring expander is its wide range of tension while maintaining circularity which permits of using what may be termed a "soft" outer ring; i. e., one having little inherent tension so it yields readily to the circular expanding influence of the inner helical spring. The wear on the outer ring is thus reduced and the sealing properties increased. Ring collapse is also completely eliminated as is also ring flutter because of the rapidity with which the helical spring responds to varying conditions in the cylinder.

Referring now to Figs. 8 to 11 inclusive, piston P has grooves e and f in the piston head, wherein are disposed the modified piston rings R and R'. Each of the rings is made up of a plurality of elements. The ring R consists of two cylinder contacting elements 16, 17 and a helical tensioning element 18 disposed behind said elements, and positioned in recesses 19 and 20 in the opposing faces of the elements. The tensioning member 18 is in the form of a three-coil helical segment. In addition to being disposed in the recesses 19 and 20 of the ring elements 16 and 17, the segment 18 is lodged within a channel 21 formed in the bottom of groove e. There is a two-coil helical segment 22 disposed behind elements 23 and 24 of the ring R', and also lodged within a channel 25 in the bottom of groove f. The upper ring R is essentially a compression ring, and the cylinder contacting surface 16' of element 16 is a plane surface, while the cylinder contacting surface 17' of ring element 17 is a tapered surface, so that the element 17 will also serve to remove excess oil from the cylinder wall. The ring R' within the groove f is primarily an oil ring, and the lower element 24 thereof is provided with oil drainage passageways 26, formed in its lower surface, whereby excess oil may drain through the groove f to the drainage ports 27 in the piston wall from which the oil will ultimately find its way back to the crank case.

By referring to Figs. 9 to 11 inclusive it will be seen that the helical spring expander 18 has a crimp 28 formed in its middle coil 29 (or coils) so as to insure that the outer coils 30, 30 will be in a common plane and all the coils will be in parallelism. This is essential because the coils lying on opposite sides of the parting joint between ring elements 16 and 17 must each contact only one of said elements to permit the elements to operate independently. Along the length of the crimp (or cross-over) the coil 29 has a notch 31 cut into its outer edge so as to remove the metal that otherwise would contact two ring elements. The notch 31 also performs a locking function as its edges 32, 32 frictionally engage the circular walls 33, 34 of recesses 19 and 20 to prevent the ring elements 16 and 17 from rotating against these edges. The elements are held from rotating in the opposite direction by their own frictional contact.

In assembling the ring elements 16 and 17 and helical expander spring 18, the gaps s, s of the elements and the notch 31 are spaced 120° (Fig. 10).

The number of turns imparted to the expander springs is variable depending on the face width of the rings and the degree of tension to be imparted thereto. The ends 35, 35' of the expander springs 18 and 22 are beveled as shown (Fig. 10).

One of the advantages of having the helical expanding segment disposed between the ring elements is that each ring element is acted on by only one coil or turn of the expansible spring, this enables the ring elements to operate independently of one another even though both are under tension of but a single expanding element.

A further advantage of lodging the expander element within a channel in the bottom of the grooves, as shown in the construction of the rings located in the piston head, is that a more tortuous path is provided for the flow of oil that may get past the ring elements, and thus reduce the tendency toward oil leakage, and blowby.

An additional advantage of my improved expander spring is that it does not obstruct the free flow of oil through the drainage ports of the oil rings as does the type of expander that fits into the groove behind the ring.

Having described my invention, I claim:

1. A piston packing ring comprising an annular split cylinder contacting element having no substantial inherent tension, and a spring element disposed within the circumferential margin of the cylinder contacting element, said spring element being in the form of a flat helix of at least two turns, said helix operating expansively against the cylinder contacting element on all points in its circumference.

2. A piston packing ring comprising a pair of annular split cylinder contacting elements in axial juxtaposition, the contacting side faces of said elements having oppositely disposed recesses together constituting an annular channel in the rear faces of the elements, a flat helical spring element of at least two turns disposed in said channel so that one turn bears against one cylinder contacting element and another turn of the helix bears against the other cylinder contacting element.

3. A piston packing ring comprising a pair of annular split cylinder contacting elements in axial juxtaposition, the contacting side faces of said elements having oppositely disposed recesses together constituting an annular channel in the rear faces of said cylinder contacting elements, a flat helical spring element of at least two turns disposed in said channel so that one turn bears against one cylinder contacting element and another turn of the helix bears against the other cylinder contacting element, and means for frictionally locking said elements against circumferential movement.

4. In combination with a piston having a piston ring groove, an annular channel in the bottom of said groove, a piston packing ring comprising an annular split cylinder contacting element having no substantial inherent tension, and a helical spring element disposed within the circumferential margin of the cylinder contacting element and exerting radial pressure against all points in its circumference, said spring element being disposed within the ring groove channel.

FRANK. D. FRISBY.

REFERENCES CITED

The following references are of record in the file of this patent:

UNITED STATES PATENTS

| Number | Name | Date |
|---|---|---|
| 1,515,246 | Ford | Nov. 11, 1924 |
| 1,694,566 | Solenberger | Dec. 11, 1928 |
| 1,764,815 | Williams | June 17, 1930 |
| 1,868,744 | Grant | July 26, 1932 |
| 2,228,495 | Williams | Jan. 14, 1941 |